(12) United States Patent
Channell

(10) Patent No.: US 9,240,020 B2
(45) Date of Patent: Jan. 19, 2016

(54) METHOD OF RECOMMENDING CONTENT VIA SOCIAL SIGNALS

(75) Inventor: Brian Channell, Redondo Beach, CA (US)

(73) Assignee: YAHOO! INC., Sunnyvale, CA (US)

( * ) Notice: Subject to any disclaimer, the term of this patent is extended or adjusted under 35 U.S.C. 154(b) by 205 days.

(21) Appl. No.: 12/861,936

(22) Filed: Aug. 24, 2010

(65) Prior Publication Data

US 2012/0054275 A1    Mar. 1, 2012

(51) Int. Cl.
*G06Q 30/02*    (2012.01)

(52) U.S. Cl.
CPC ............ *G06Q 30/0278* (2013.01); *G06Q 30/02* (2013.01)

(58) Field of Classification Search
CPC .......................... G06Q 30/02; H04L 29/08666
USPC .................................................. 709/203, 204
See application file for complete search history.

(56) References Cited

U.S. PATENT DOCUMENTS

| | | | |
|---|---|---|---|
| 5,982,369 A | 11/1999 | Sciammarella et al. | |
| 6,453,404 B1 | 9/2002 | Bereznyi et al. | |
| 6,526,440 B1 | 2/2003 | Bharat | |
| 6,636,854 B2 | 10/2003 | Dutta et al. | |
| 6,839,702 B1 | 1/2005 | Patel et al. | |
| 6,862,559 B1 | 3/2005 | Hogg | |
| 6,947,930 B2 | 9/2005 | Anick et al. | |
| 7,103,589 B1 | 9/2006 | Kepler et al. | |
| 7,152,065 B2 | 12/2006 | Behrens et al. | |
| 7,853,622 B1 * | 12/2010 | Baluja et al. | 707/803 |
| 2002/0151327 A1 | 10/2002 | Levitt | |
| 2004/0078213 A1 | 4/2004 | Brice et al. | |
| 2004/0220944 A1 | 11/2004 | Behrens et al. | |
| 2005/0038775 A1 | 2/2005 | Haveliwala et al. | |
| 2005/0246328 A1 | 11/2005 | Zhang et al. | |
| 2006/0026013 A1 | 2/2006 | Kraft | |
| 2006/0117002 A1 | 6/2006 | Swen | |
| 2006/0224624 A1 | 10/2006 | Korn et al. | |
| 2007/0118498 A1 | 5/2007 | Song et al. | |
| 2007/0192293 A1 | 8/2007 | Swen | |
| 2004/0294225 | 12/2007 | Radlinski et al. | |
| 2008/0010615 A1 | 1/2008 | Curtis et al. | |
| 2008/0072145 A1 | 3/2008 | Blanchard et al. | |
| 2008/0154878 A1 | 6/2008 | Rose et al. | |

(Continued)

FOREIGN PATENT DOCUMENTS

| | | |
|---|---|---|
| JP | 2006-309660 | 11/2006 |
| KR | 1020030058660 | 7/2003 |
| KR | 10-2006-0059986 A | 6/2006 |

OTHER PUBLICATIONS

PCT Application No. PCT/US2010/040554, PCT International Search Report and Written Opinion,; Mailing Date: Jan. 14, 2010 8 pages.

(Continued)

*Primary Examiner* — Asghar Bilgrami
(74) *Attorney, Agent, or Firm* — Hickman Palermo Becker Bingham LLP; Dominic Tsang

(57) ABSTRACT

A method for recommending content via social signals is provided. Two different content sets having content objects that have content-identifying information are received from separate content providers. Social graph information is received from a service provider. A portion of the first content set and a portion of the second content set are aggregated based at least in part on the social graph information, thereby generating a third content set.

8 Claims, 8 Drawing Sheets

(56) References Cited

U.S. PATENT DOCUMENTS

| | | | |
|---|---|---|---|
| 2008/0255933 | A1 | 10/2008 | Leventhal et al. |
| 2008/0319943 | A1 | 12/2008 | Fischer |
| 2009/0144392 | A1 | 6/2009 | Wang et al. |
| 2009/0157668 | A1 | 6/2009 | Newton et al. |
| 2010/0138491 | A1 | 6/2010 | Churchill et al. |
| 2010/0146048 | A1 | 6/2010 | Rothstein |
| 2011/0010371 | A1 | 1/2011 | Xu et al. |
| 2011/0113095 | A1* | 5/2011 | Hatami-Hanza .............. 709/204 |
| 2011/0208822 | A1* | 8/2011 | Rathod .......................... 709/206 |
| 2011/0238754 | A1* | 9/2011 | Dasilva et al. ................ 709/204 |
| 2011/0246560 | A1* | 10/2011 | Gibson ......................... 709/203 |
| 2011/0320380 | A1* | 12/2011 | Zahn et al. .................... 705/347 |
| 2014/0006422 | A1 | 1/2014 | Xu |

OTHER PUBLICATIONS

PCT Application No. PCT/US2010/040554, Current claims 4 pages.
"Social plugins" Facebook Developers downloaded from the Internet on Jul. 23, 2010 < http://developers.facebook.com/plugins > 1 page.
Taiwan Intellectual Property Office, "Office Action" in application No. 100129176, dated May 23, 2014, 4 pages.
Current Claims in application No. 100129176, dated May 2014, 9 pages.
Su, Susan, Inside FaceBook.com, "New Facebook Activity Stream Plugin Brings Filtered Stream to Any Website", dated Apr. 21, 2010, 3 pages.
U.S. Appl. No. 14/019,931, filed Sep. 6, 2013, Final Office Action, May 13, 2014.
"Ajax (programming)" downloaded Jul. 14, 2006 http://en.wikipedia.org/wiki/AJAX (4 pages).
"Berry Talks! Common Sense for Uncommon Times" downloaded Jul. 27, 2006 http://www.edithere.com/barry/2006/05/09 (2 pages).
Rose, D. et al., "Understanding User Goals in Web Search" (7 pages).
Wei, C., "AJAX: Asynchronous Java + XML?" (2005) downloaded Jul. 14, 2006 http://www.developer.com/design/print.php/3526681 (11 pages).
Zhang, "Improving Web Search Results Using Graph", dated Aug. 19, 2005, 8 pages.
Brenner, "Planning a Search Strategy", dated 2003, 3 pages.
Delft University of Technology, "Glossary", dated 2007, 7 pages.
Franklin, "How Search Engines Work", dated Feb. 28, 2006, 6 pages.
U.S. Appl. No. 14/019,931, filed Sep. 6, 2013, Notice of Allowance, Dec. 3, 2014.
"Notification of Transmittal of the International Search Report and the Written Opinion of the International Searching Authority, or the Declaration" received in International Application No. PCT/US11/45262 dated Feb. 21, 2012 (14 pages).
Current Claims of International Application No. PCT/US11/45262 dated Feb. 2012 (6 pages).
U.S. Appl. No. 12/499,040, filed Jul. 7, 2009, Final Office Action, Jan. 31, 2012.
U.S. Appl. No. 12/499,040, filed Jul. 7, 2009, Office Action, Aug. 8, 2011.

* cited by examiner

METHOD OF RECOMMENDING CONTENT VIA SOCIAL SIGNALS

FIELD OF THE INVENTION

The present invention relates to content recommendation systems.

BACKGROUND

The amount of content available on the Internet is growing at a staggering rate. News stories, multimedia presentations, blog entries, music, user generated content, and other forms of information are generated by a large number of sources, and there is no sign that this trend is slowing. Web sites and other publishing tools have made it trivial for authors to place content on the Internet for all to see, even if these authors do not consider themselves "tech-savvy." At the same time, traditional news sources such as newspapers and magazines are generating more content than ever before and posting it to web sites in order to capture a larger market.

Many web sites, such as the "My Yahoo!®" page by Yahoo! Inc., allow users to view original content from the web site provider, as well as content from a variety of partners and other third-party sources. By using content feeds such as RSS (Really Simple Syndication) feeds, Atom feeds, and other content distribution technologies, users are able to select content sources and customize their home page so that it reflects their interests. For example, one user may place the "Oddly Enough News" feed by Thompson Reuters on their home page alongside other news feeds, video feeds, blog feeds, and other content. Another user may choose an entirely different set of content sources to follow. News feed aggregators and other content selection technologies also allow similar functionality, with varying degrees of control, features, and presentation options.

Even though a "human filter" is constructively applied to the available content through the content selection process, it is common for users to profess interest in a much larger amount of information than they are capable of digesting. For example, users may subscribe to scores of news feeds and other groups of content, but may only have the time or desire to read, watch, or otherwise consume a small percentage of that content.

A certain amount of the content delivered to users is of little or no interest or value to the user, even if the user has time to digest the content. This is true even of content delivered via content sources selected by the user. For example, a user that has selected a content feed named "Politics" may only be interested in one or two of the stories presented via that feed. The lack of interest may, among other reasons, be due to a feed selection mismatch, or may be a symptom of a quality problem with the feed logic that selects content for that feed.

Since only a small amount of content delivered by each content source is consumed by users, it is common for users to select multiple feeds that are similar to one another. For example, a user may select several content feeds from publishers of national news or aggregators of political news. Although this technique may increase the number of content items, e.g., news stories, articles, and other media, it may also increase clutter, making it difficult for users to select relevant content without being overloaded by irrelevant content.

The relevancy of the content may vary from content provider to content provider. One content provider may take pride in matching the description of the feed with the contents provided via the feed, and may use advanced methods to ensure maximum relevancy to the broadest consumer base. However, relevancy may also vary from user to user. In other words, content that is interesting to one user may be uninteresting to another based on mood, time of day, level of education, or many other "human" factors.

Facebook®, a social networking web site, has circumvented the content aggregation model described above by allowing users who are friends with one another, i.e., connected via the web site, to recommend content to each other. Users post links to news articles, videos, and other content items that are accessible via the Internet, sometimes along with introductory comments meant to introduce the content to friends. Comments may be attached to postings by other users of the web site, such as friends of the user. In addition, friends of the posting user may signal their approval of content by pressing a "thumbs up" button. This content, however, is found in a sea of personal postings and micro blog updates by friends, and users are unable to specify content categories that they are interested in.

CNN® uses information gathered from Facebook® to list stories that are popular on the social networking site. For example, a large number of users may post links to CNN® stories, and CNN® provides a list of the most popular stories to users of the CNN® web site. In addition, Facebook® provides "social plug-ins" that allow users of web sites such as the CNN® web site, to view a list of content items from the same web site that are recommended by the user's friends on Facebook®. However, the user must be currently visiting the CNN® web site, and will only see CNN® web site stories that are linked to or recommended by friends.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
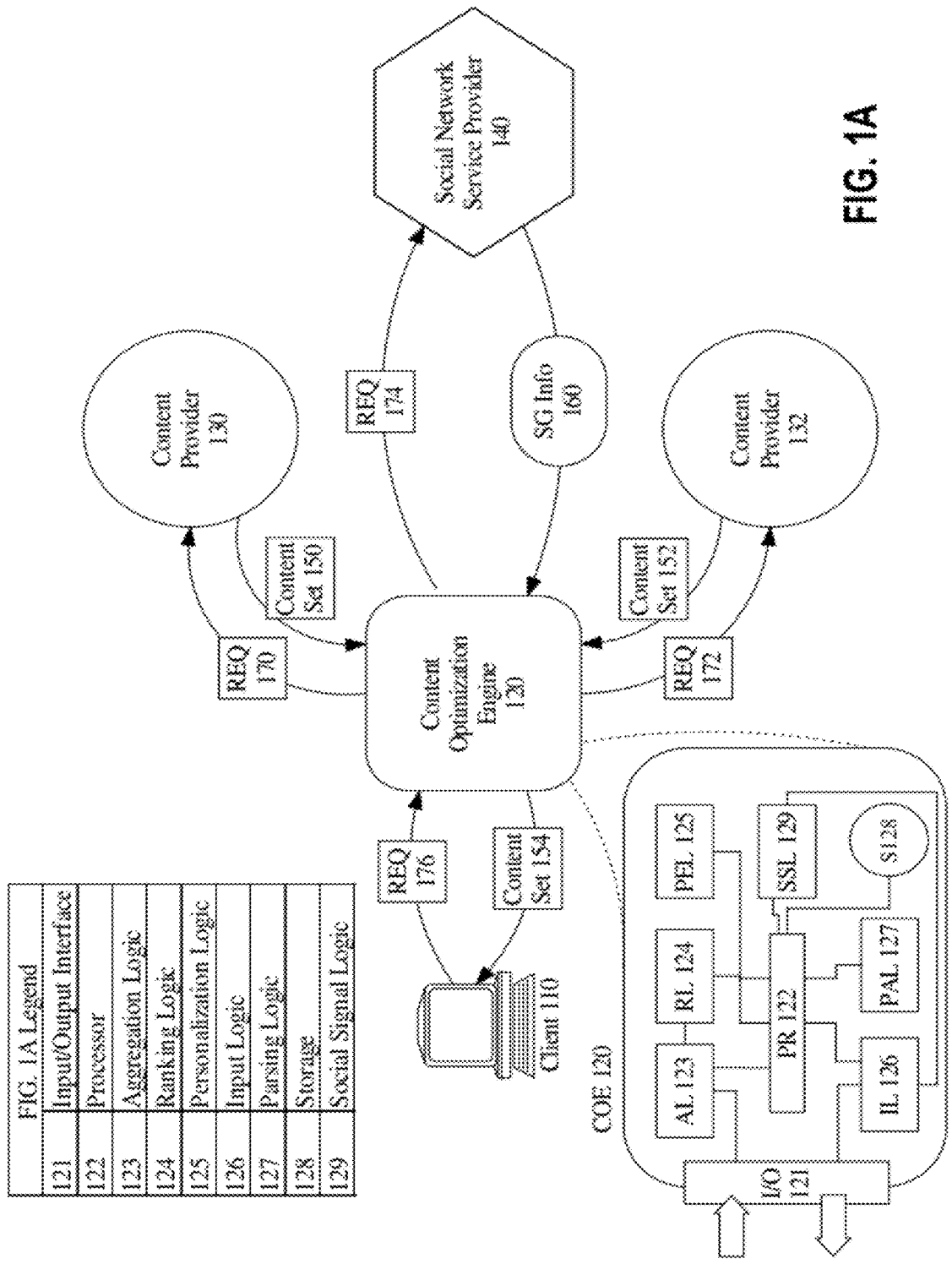
FIG. 1A illustrates a block diagram of an environment in which an embodiment may be implemented.

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

General Overview

Users of the Internet often "register," or create "accounts" with a variety of web sites by generating unique identifiers such as user names. By registering with a web site, a user becomes uniquely identifiable to the web site, allowing the user to create, request and receive personalized content. Users often must log in to each web site in order to view this personalized content.

According to one embodiment, a user may log in to a personalized home page, which is configured to deliver personalized news feeds and other content to the user. Multiple content feeds such as RSS feeds, each coming from a different content provider, are requested by the home page provider. These content feeds may have been chosen by the user when configuring the personalized home page. For example, a first news feed may be retrieved from CNN®, and a second news feed may be retrieved from Fox News®. Each of the news feeds includes a list of content objects that identify news articles. The content objects may include, for example, a title for the news article and a link to that news article. A small portion of the article, such as the first three lines of text, may also be included in the content object.

In an embodiment, the user is also a member of a social networking website, where the user is connected to other users. These other users are often referred to as "friends" or "connections" of the user. Friends of the user may have already viewed some of the news articles and provided feedback on them. For example, one friend may have posted a link to one of the articles on the social networking website. Another friend may have provided a rating for the article, giving it four out of five stars. These actions, and other actions associated with content are called "social signals." Evidence of social signals may be stored by social networking providers.

The user's social graph information, i.e., information associated with the user's social network, may be requested by the user's home page provider. In an embodiment, the social graph information includes information about social signals generated by the user's friends. The social graph information is then used to determine which content may be more relevant to the user. For example, content that has been recommended or commented on by the user's friends or connections may be deemed to be more relevant to the user. A single news feed is created, based on social graph information such as social signals, from content objects in the CNN and Fox News feeds in an embodiment. Thus, news articles may be placed in order of relevance based on social signals and other social graph information, even if the content comes from multiple sources.

Although embodiments are described in the context of news feeds and social networking websites, embodiments may be applied to other types of content and content delivery mechanisms as well as different types of websites that allow users to create associations with other users.

Structural and Functional Overview

FIG. 1A illustrates a block diagram of an environment in which an embodiment may be implemented. Content optimization engine 120 is communicatively coupled to client 110, and received requests from client 110. For example, client 110 may send requests such as request 176 to content optimization engine 120. Request 176 may be a request for content, such as content 154 which is sent from content optimization engine 120 to client 110.

In an embodiment, content optimization engine 120 may also be communicatively coupled, via a network such as the Internet, to content providers such as content providers 130 and 132. Content optimization engine 120 sends requests such as requests 170 and 172 to content providers. These requests may include requests for sets of content objects such as content sets 150 and 152. For example, content optimization engine 120 may request a content feed that contains content objects made up of metadata associated with content on the Internet. Metadata may include a URL (Uniform Resource Locator) that identifies the location of the content on the Internet, a title for the content, an image or URL identifying the location of an image associated with the content, and other data about or associated with the content.

Figure 1B:
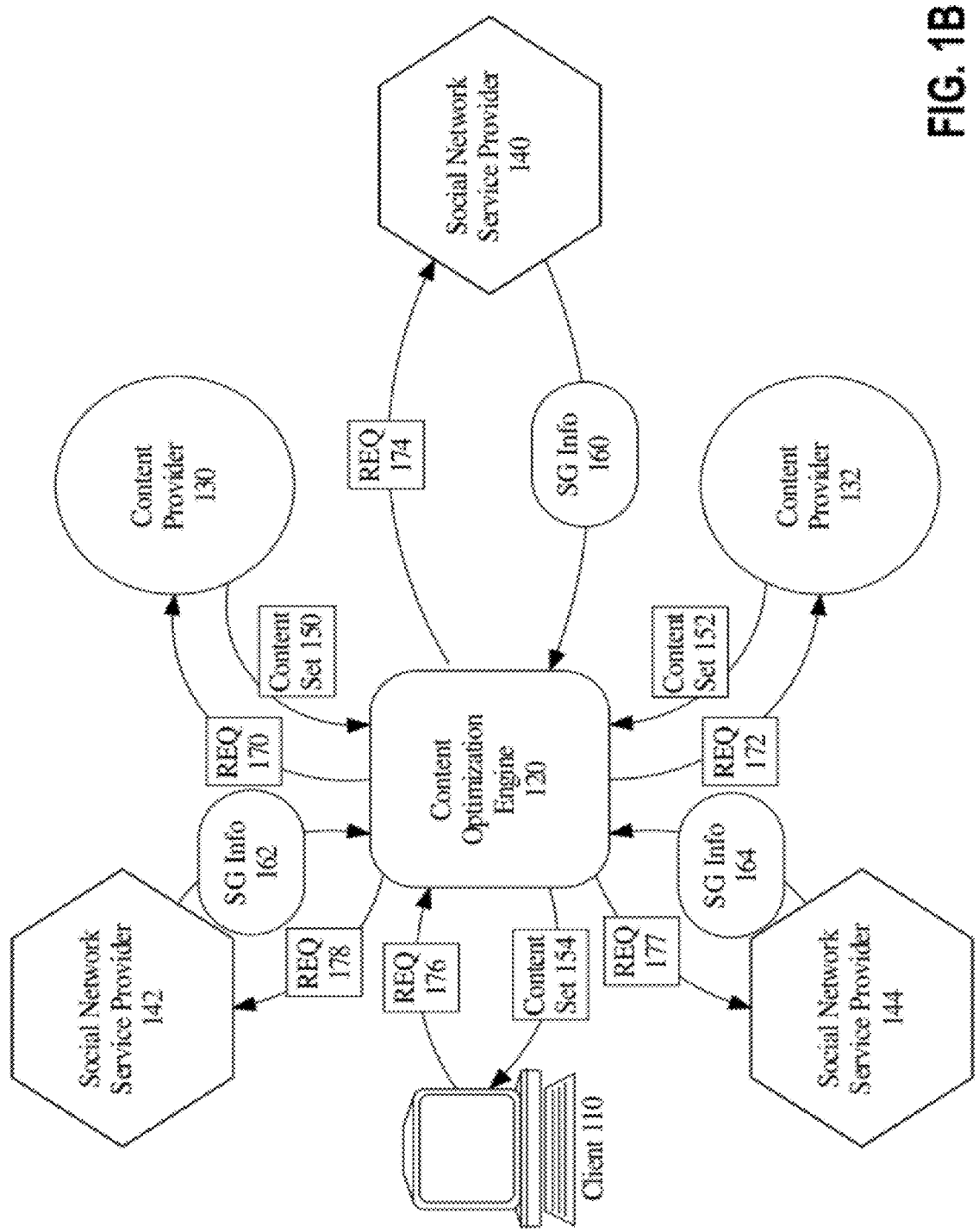
FIG. 1B illustrates a block diagram of an environment in which an embodiment may be implemented.
Figure 1C:
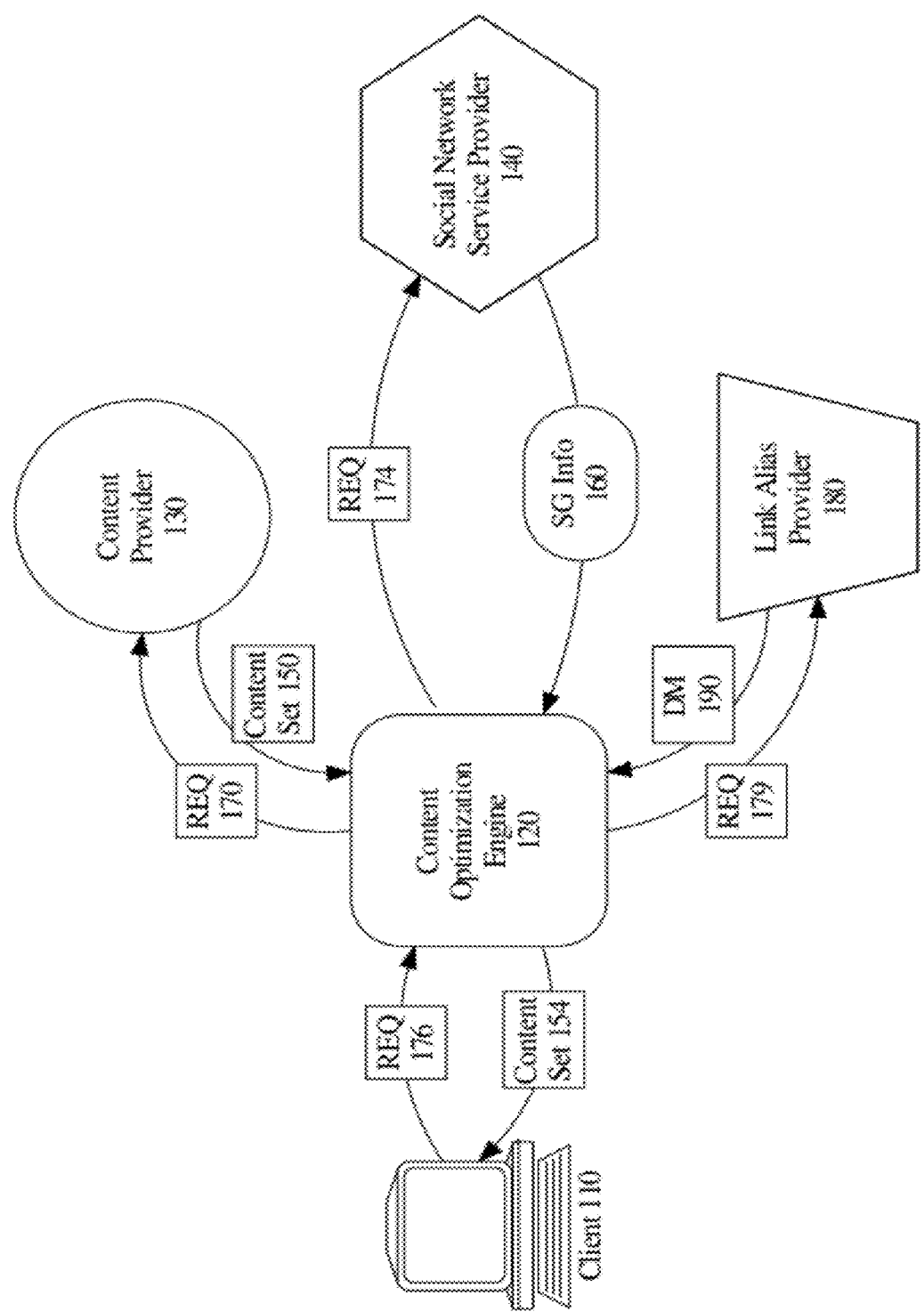
FIG. 1C illustrates a block diagram of an environment in which an embodiment may be implemented.

As shown in FIG. 1C, one or more link alias providers such as link alias provider 180 are communicatively coupled to content optimization engine 120 via a network. Requests such as request 179 may be sent from content optimization engine 120 to a link alias provider. These requests are for information associated with a particular content object or URL, such as a distribution metric that indicates the popularity of the object or URL. The link alias provider may determine the distribution metric, such as distribution metric 190, based on the number of requests made for a URL alias associated with the object or URL.

Content optimization engine 120 is also communicatively coupled, via a network, to a social network service provider such as social network service provider 140 in an embodiment. Content optimization engine 120 sends requests such as request 174 to a social network service provider. In an embodiment, many social network service providers may be the subject of such requests. Social network service providers send social graph information such as social graph information 160 and associated information and social graph elements to the content optimization engine 120.

Figure 2:
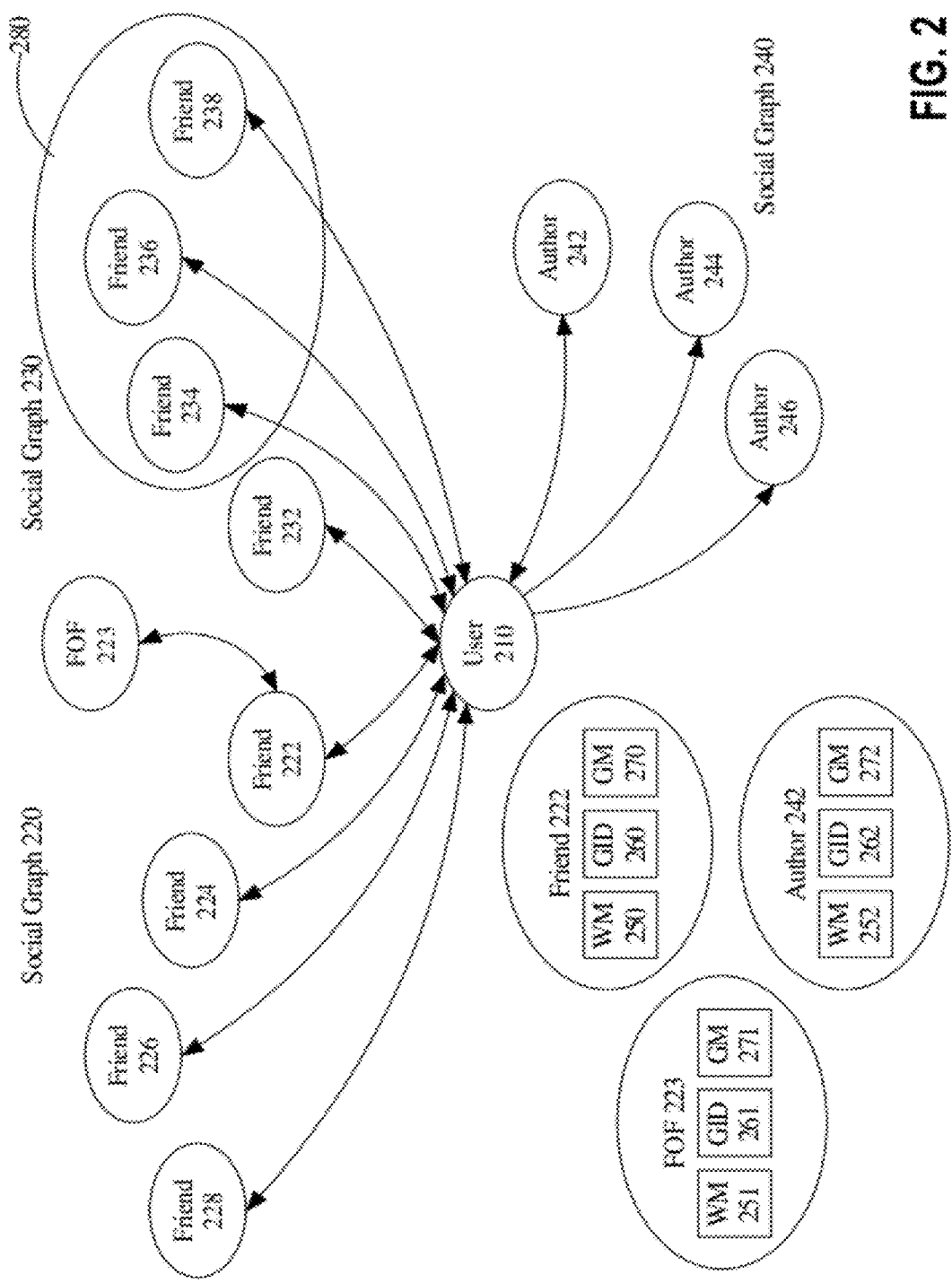
FIG. 2 illustrates a logical diagram representing a social graph and social graph elements in an embodiment.

FIG. 2 illustrates a logical diagram representing a social graph and social graph elements in an embodiment. Social graphs may be combined with one another to create larger social graphs, as long as a logical common node exists. For example, user 210 is a node in three separate social graphs: social graph 220, social graph 230, and social graph, 240. These social graphs may be generated by different social network sites, such as Yahoo!® PULSE, Facebook®, or Twitter®. For example, user 210 may be a user of all three of these social networking web sites, which may each use an open authorization mechanism such as OAuth (Open Authorization) to allow secure API authorization from desktop and web applications. Friends 222 and 224-238 have a direct relationship with user 210, and so do authors 242-246. Friend-of-friend 223 is connected to user 210 via friend 222.

Connections, such as friends, authors, and others, may be grouped together into a connection group such as connection group 280. In an embodiment, each group may be associated with one or more importance metrics that indicate a weight that should be given to recommendations provided by members of the group. Examples of group metrics are group metrics 270-272, which are associated with friend 222, friend-of-friend 223, and author 242, respectively. Friend 222, friend-of-friend 223, and author 242 also have an associated individual weight metric such as weight metrics 250-252 and group identifiers such as group identifiers 260-262 in an embodiment. Other metrics and additional instances of the same types of metrics discussed may be associated with friends, authors, and other connections in an embodiment.

Content optimization engine 120 includes one or more input/output interfaces, such as input/output interface 121. The input/output interface may be configured to receive requests, such as request 176 from client computing devices such as client 110. The input/output interface may be connected to input logic 126, which is configured to manage throughput of information in an embodiment. For example, input logic 126 may create a buffer in storage 128, which may include one or more volatile or non-volatile memory devices. All devices in content optimization engine 120 are capable of being communicatively coupled to one another via a BUS, such as BUS 602 (not shown in FIG. 1A). Content optimization engine 120 includes one or more processors such as processor 122, which is coupled to aggregation logic 123. Aggregation logic 123 is configured to perform aggregation of content objects based on personalization information generated from personalization logic 125, social signal information generated by social signal logic 129, and ranking information received from ranking logic 124. Personalization information may be based in part on filters generated by a user of the system and stored in storage 128. Social signal information may be derived from social graphs and weighting metrics associated with social graph information received from social network service providers. Ranking information may be based on traditional ranking methods and metrics associated with the content providers that provide the content objects, such as content provider 130. When aggregated content is generated by aggregation logic 123, the aggregated content may be delivered as output via input/output interface 121 to a client, such as client 110 in the form of a content set, such as content set 154.

Social Signals

Social networking web sites, such as Yahoo!® PULSE, Facebook®, and Twitter® allow users to interact with one another. These sites typically allow users to display pictures, comments, notes, status updates, songs, videos, and more. Content on social networking sites may be generated by end-users that utilize the online service in order to share the content and connect with others.

Users of social networking web sites may perform many actions that are directly or indirectly associated with content. These actions may be associated with content that is generated by the users of the web site as well as content that is created by content providers and other interactive web sites. Many such web sites, such as the CNN® home page, provide interactive tools that allow users to post comments about, like, or otherwise generate events associated with the content on social networking web sites. For example, a user may be reading a news story that touts environmental responsibility and sustainability. The user may enjoy the article and wish to share it with his friends, so he clicks on a Facebook® logo provided by the CNN® web site, enters a comment, and with a single click of the mouse button, posts a link to the story, an associated picture, the title of the story, and his comment to his Facebook® wall. If he does not want to take the time to post a comment, he may simply click a "thumbs up" button on the news article page to indicate that he likes the article.

Social signals may be defined as any action or evidence of action taken by a user. Often, the users are part of a social graph, and the action taken is associated with content on the Internet. These actions are key indicators of interest. For example, when a user clicks a "thumbs up" button on a web video to indicate that he likes the web video, the action is the clicking of the "thumbs up" button, and evidence of the action may be stored in a database or other storage in the form of a time stamp and an identifier associated with a particular action and an object. Evidence may be stored using other identifiers or without time stamps in other embodiments. The interest shown by the user is presumably positive, since he clicked a "thumbs up" button.

Other social signals are less clear about the opinion of the user, but more clearly indicate a level of interest. For example, when a user posts a link to a news article along with a comment to his social networking page for his friends to see, his posting of a comment about the content he is linking to indicates a certain level of interest. Furthermore, the length or content of the comment posted by the user may indicate further interest. For example, if the user's comment has many exclamation marks at the end, it may be assumed that the user wants all of his friends to read the article, or at least his comments on it. In addition, if a user places key words in the comment, such as "world cup," the content of the comments posted in association with the article may also be used to match content for friends of the user. In other words, friends of that user may perform a search for "world cup" via Yahoo. Search and the content posted by the user on Facebook® will be considered more relevant based on the friendship and the matching comment.

A non-exclusive list of social signals include: generating a content object or content, recommending a content object or content, flagging a content object or content, reviewing a content object or content, viewing a content object or content, posting a link to a content object or content, and posting content that is related to a content object. Any action a user takes may be considered a social signal.

Generating a content object may include posting a link to content that can be found elsewhere on the Internet, such as a news story, not written by the user, that is on a web site that is not the web site to which the content object is being posted. Generating content may include actually creating the content that is to be consumed. For example, a user may create a video and upload it to a video-sharing web site. Or, a user may provide a comment on a news article published by CNN® using his Facebook® login that is associated with his CNN® login. This may result in the creation of a content object in Facebook®.

Recommending a content object or content may include any means of providing an indication to other users that those users should read, view, or otherwise consume the content being recommended. For example, a user may provide a "star rating" for a web video, giving the video a rating of four out of five possible stars, indicating that the content is good, but not excellent. Flagging may also be one way of recommending content. For example, a user may be viewing a news article on a web site, and may press a "thumbs up" button to indicate that he likes the content. Flagging may also be used to indicate that the user dislikes content, feels that the content is inappropriate for certain users, or otherwise mark the content with some designation.

Reviewing a content object or content may include actually writing a review associated with content. For example, an online book retailer may post a web page that is dedicated to the sale of and information about a particular book. Either the book or the web page about the book could be considered content. A user may write a detailed book review about the book, and even provide a rating for the book. The book review, when posted, will likely be associated with a user profile attached to the online book retailer.

Viewing a content object or content may include clicking on a link that is posted on a social networking site by another, or simply visiting a web site. There are many ways to track the viewing of content. For example, when a link is posted to a social networking web site, it is common for the social networking web site to alter the link to point to a redirect script on the social networking web site, which will redirect the request to the originally intended location. This enables the social networking web site to determine which links users are clicking on within their web site, and log the user action.

Posting a link to a content object or content may include actually typing a link into a form provided by the social networking web site or simply pressing a button provided by a content provider that is designed to automatically post a link to the current page to the social network provider associated with the button. The link is usually associated with the user that posts the link.

Posting content that is related to a content object may include adding comments, pictures, or metadata associated with posted content objects. For example, a user may wish to post a video on his Facebook® wall. If the video is hosted by a video hosting service, the posting may include information required to locate the video, such as a URL, along with an image used to entice viewers into viewing the video and a title and description of the video. Most, if not all, of this information is determined by the author of the video, and not necessarily the user posting the content object (although the author and the poster may be the same person). The user posting the content object may wish to provide, in the posting, more information than the content object includes. For example, the user may wish to explain to his friends why he is posting the video by adding additional comments to the posting. In addition, the user may include information that indicates whether or not he actually likes the video. This information may include a star-rating or a like/dislike indicator as described above.

Although several specific examples of social signals have been described above, these examples represent only a subset of social signals that may be tracked by service providers. Any social signal may be used to aggregate content or recommend content to users in an embodiment.

Aggregating Content Based on Social Signals

FIG. 1A illustrates a block diagram of an environment in which an embodiment may be implemented. Client 110 may make a request 176 to content optimization engine 120 for a content set. The request 176 may comprise a search query, a request for a personalized home page, or any other request that involves the delivery of content or content objects. The content optimization engine makes requests for content to content provider 130 and content provider 132. For example, the user of client 110 may have subscribed to an RSS feed associated with each of the content providers in an embodiment. Each of the content providers provides a content set (content sets 150 and 152) to content optimization engine 120. Content optimization engine 120 also requests social graph information 160 from social network service provider 140. Social network service provider 140 sends social graph information 160 to content optimization engine 120.

Social graph information 160 includes information associated with a user's social graph, and may or may not include a complete social graph. In an embodiment, social graph information 160 may include one or more social graphs such as social graphs 220, 240, and 280, along with information about friends, authors, and other connections within the social graph. In another embodiment, content optimization engine requests only social graph information that matches content provided by one or more content providers. For example, content provider 130 may provide a list of content objects. If content metadata, such as title, keywords, link information, or other information can be matched to a content object, content metadata, or a social signal associated with a node in the social graph, then those nodes and relevant data about those nodes may be returned. Varying degrees of information may be requested from and/or returned by a social network service provider.

Social graph information 160 may indicate that a particular content item is popular among the user's friends. For example, the user may be user 210 and a particular news story about plans to build a high-speed train between Los Angeles and San Jose may be popular among his friends in social graph 220. Friend 222 may have posted a link to the story along with a comment, and friends 224 and 226 may have indicated that they liked the story. In addition, friend-of-friend 223 may have also commented on the story, or re-posted it to his friends. All or any amount of information about these social signals may be included in social graph information 160.

Based on the social signals associated with the news story displayed by user 210's friends, the content object is placed into content set 154 and delivered to client 110. Many actions may be taken based on the popularity determination. For example, if content set 154 is limited by user preferences, say, to a certain number of content objects, social signals may determine whether or not each content object "makes the cut." Content objects with high relevancy as determined by other methods may still outrank content associated with particular social signals, but social signals may be a key part of determining placement and/or location.

Content objects associated with social signals may be displayed on the screen to users in a unified, separate section that is distinct from other content objects not associated with social signals, even if the content objects come from different content feeds. For example, content objects A, B, C, D, and E may be content objects delivered by content provider 130, and content objects V, W, X, Y, and Z may be content objects delivered by content provider 132. If content objects A, C, D, X, and Y are in any way associated with a social signal, then these content objects may be displayed together on a portion of the display provided to the user 210. This portion of the display may even be designated as "socially selected articles."

Figure 3:
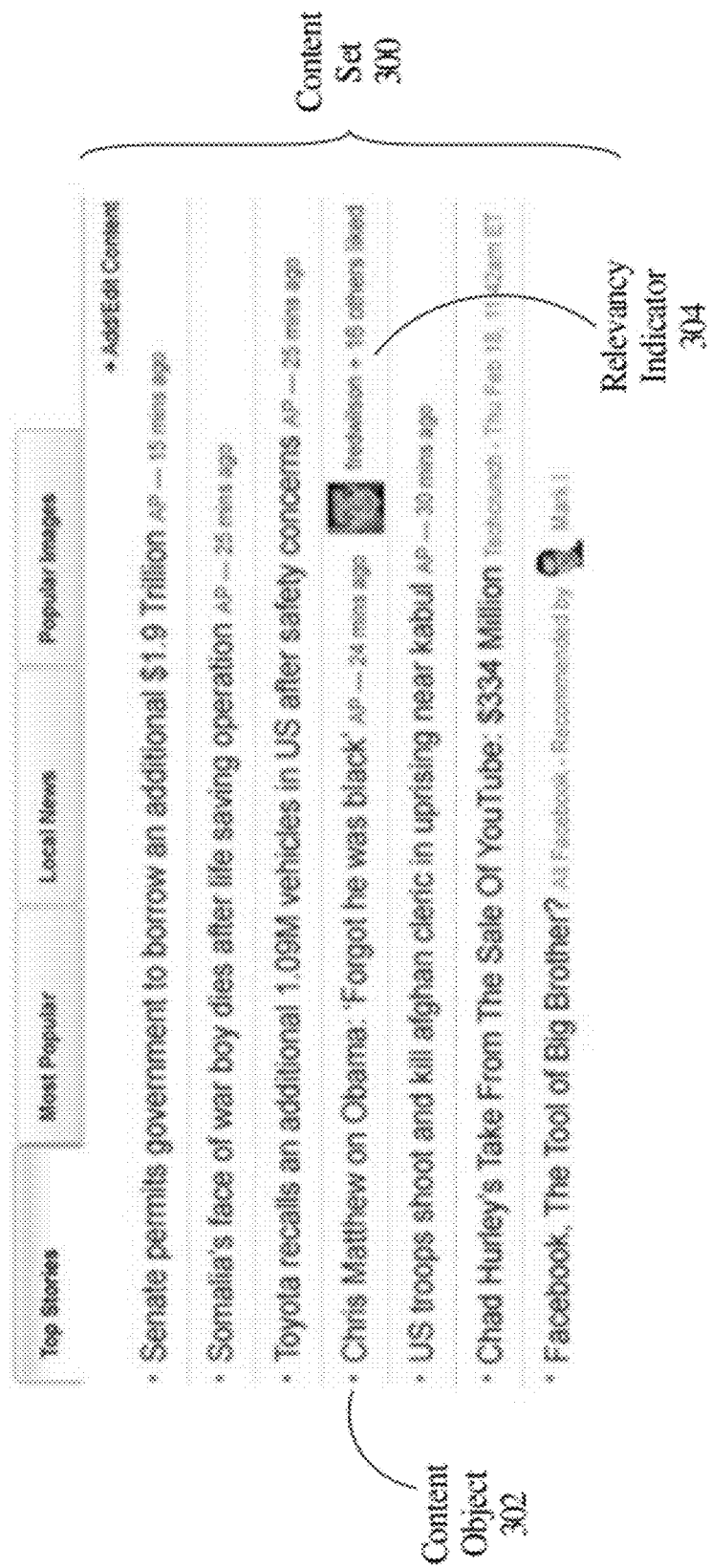
FIG. 3 illustrates sample output generated in an embodiment.

FIG. 3 illustrates sample output generated in an embodiment. Content set 300 includes several content objects in a "top stories" category. Content object 302 includes an optional relevancy indicator 304 that is based on several social signals. A picture or avatar of "fredwilson" (the user name for Fred Wilson) is displayed, along with an announcement that "fredwilson+16 others liked this." Information associated with Fred Wilson may be displayed because he is an "important" user within the requesting user's social graph. For example, Fred Wilson may be a friend, friend-of-friend, or N-degrees of separation away from the user in a social graph. The 16 other users described by the relevancy indicator may be other users of the social networks that the user 220 is connected to. These users may or may not have a meaningful association with user 220. More than one "important" user may be displayed in an embodiment. In another embodiment, no information related to social networks is displayed, but any information collected about users of social networks may still used for determining the placement of content objects.

FIG. 1B illustrates a block diagram of an environment in which an embodiment may be implemented. Specifically, FIG. 1B includes additional social network service provider 142 and additional social network service provider 144. Content optimization engine may also make requests (177 and 178) to these additional social network service providers for social graph information (162 and 164). The additional social graph information may be used to determine whether or not a content object is included in content set 154. For example, if social graph information 160 identifies that a first user "likes" a particular content object, but social graph information 162 and social graph information 164 may identify several users that "dislike" the same content object. Social graph information 162 and social graph information 164 may outweigh social graph information 160, causing the content object to not be included in content set 154.

Metrics and Content Ranking

Social graph information, such as social graph information 160, may also be used to rank content. In an embodiment, metrics may be assigned to friends, authors, and other nodes of a social graph, and these metrics may be inherited by content objects associated with social signals that are associated with those nodes.

For example, friend 222 may post a link to a news story via a social network service provider web site. The act of posting is recorded as a social signal by the social network service provider 140, and delivered as social graph information 160 to content optimization engine 120. Information associated with friend 222 may also be included in social graph information 160. For example, the association between friend 222 and the social signal is provided to content optimization engine as social graph information 160 in an embodiment. Weight metric 251 may also be included as social graph information.

Weight metric 251 represents a measurement of credibility that should be applied to social signals associated with friend 222 in an embodiment. For example, friend 222 may have a weight metric of +5, while friend 224 may have a weight metric of +2. Other friends may have negative weight metrics. A weight metric may even be set to NULL, where the metric has no effect. Friend-of-friend 223 may have a weight metric 250 of +4, but the metric may be reduced by content optimizer based on the social graph distance from user 220. In other words, the effective weight metric of friend of friend 223 may be effectively reduced to +2 by virtue of the fact that the node is two-degrees away from user 220. A separation metric may describe this relationship, and may be used in conjunction with other metrics for ranking and aggregation purposes.

Many types of metrics may be used, and metric values need not be limited to those described herein. For example, a group metric may be assigned to a group of friends. Group 280, for example, includes three friends (friends 234, 236, and 238). Group 280 may have a group identifier that is passed to content optimization engine 220 as social graph information 160. Friend 234 may be associated with a group identifier as well as a group metric. This metric represents a measurement of credibility that should be applied to social signals associated with the group.

Conflicts between group metrics and weight metrics associated with the same friend may be resolved in many ways. For example, a user may be in a low-value group labeled "people not to chat with" because he tends to engage in chat sessions that last for unusually long periods of time. The group may have a −5 group metric value. However, the same user may have a weight metric of +10. User preferences may define the effective weight as a sum of the two values (5). In another embodiment, each metric may be given a weight, to resolve the dispute in favor of the metric considered more accurate. For example, a sum of the weight metric and 50% of the group metric may be used, for a result of 7.5 using the example above. In another embodiment, one of the metric types may be ignored. This is especially useful if one metric type is considered more accurate than others.

Metrics may be assigned to friends and groups by the user 220. In an embodiment, metrics may also be assigned by other users of the social network service provider 140. For example, friend 224 may be very popular among users in the social network service provider, which provides a user rating system. Other users may perform social signals that elevate friend 224 to a high ranking, thereby giving friend 224 additional credibility that is used for aggregating and ranking content for user 220.

Metrics may also be assigned to social networking service providers. For example, a user may deem social signals associated with Facebook® friends to be more credible than social signals associated with MySpace® friends based on the nature of the real-world relationships mimicked on these sites. Authors that the user follows on Twitter® may be given even more clout in the form of a metric because the user actually chooses to follow what the author micro-blogs about. This is a more active show of interest in opinion, as opposed to an indication that the user wants to "keep up" with the friend, as with Facebook®.

It could be assumed that users are less interested in articles for which they post no comments than for articles for which they post comments. On the other hand, if a user always posts comments on links he provides, then his commenting may be given no weight. Therefore, quality metrics may be assigned to particular types of social signals, as well as instances of particular social signals. In addition, if a particular posting includes comments with key words that match key words in a content object in one of the content sets sent to content optimization engine by a content provider, then the match may increase a relevancy metric. For example, if a first user and a second user are friends, and the first user performs a search for a digital camera which the second user has written a review about, then the content object associated with the review written by the friend would benefit from increased relevancy.

Metrics may be used to select content objects to include in a content set displayed to a user. For example, several content providers such as content provider 130 and 140 may provide various content sets to content optimization engine 120. These content sets may include content objects. For example, content objects A, B, C, D, and E may be content objects delivered by content provider 130, and content objects V, W, X, Y, and Z may be content objects delivered by content provider 132. If content objects A, B, D, X, and Z are associated with metrics that meet a particular threshold (which may be user-configured, pre-defined, or determined in a different way) then these content objects may be included in content set 154. Aggregation of multiple content sets into a different content set is performed based on social signals, and, more specifically, may be based on metrics associated with a social graph. Metrics may be considered social signals. Metrics may also be used to rank content objects. For example, content objects with high metric values may be ranked higher than content objects having lower metric values.

Example Method for Recommending Content

Figure 4:
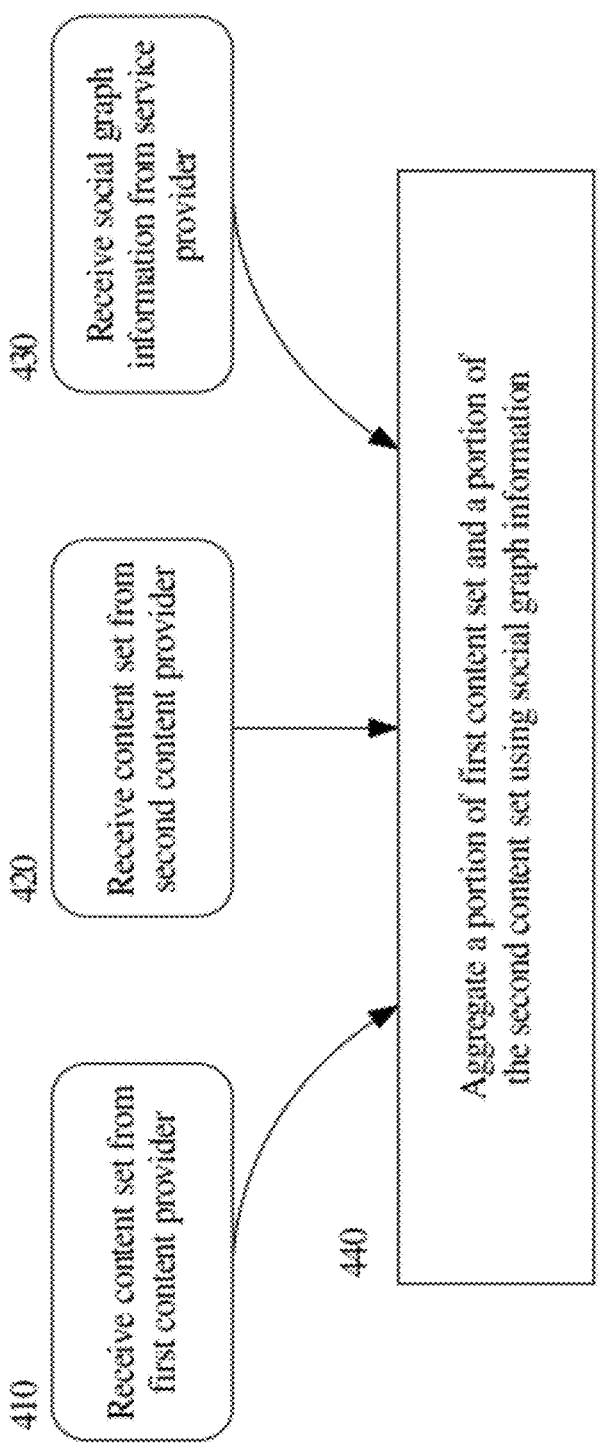
FIG. 4 illustrates a method for aggregating content in an embodiment.

FIG. 4 illustrates a method for aggregating content in an embodiment. At step 410, a first content set from a first content provider is received. At step 420, a second content set is received from a second content provider. For example, the first content provider may be a news service and the second content provider may be a web video site. The first content set may be provided in response to a request being made by a computing device to a URL that identifies an RSS feed. The second content set may be provided in response to a request being made to a URL that identifies an Atom feed. At step 430, social graph information is received from a service provider. For example, social graph information may be received from Facebook®. At step 440, a portion of the first content set and a portion of the second content set are aggregated based at least in part on the social graph information.

Figure 5:
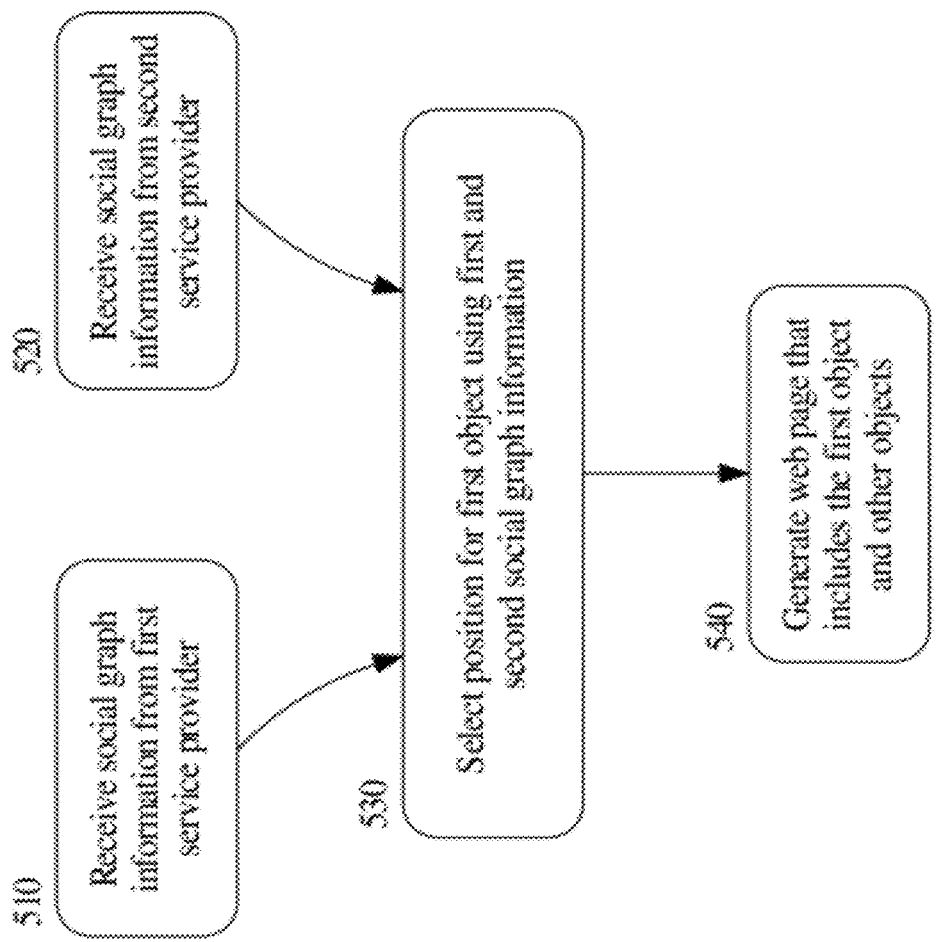
FIG. 5 illustrates a method for generating a web page using social graph information in an embodiment.

FIG. 5 illustrates a method for generating a web page using social graph information in an embodiment. At step 510, first social graph information is received from a first service provider. At step 520, second social graph information is received from a second service provider. At step 530, the position for a first content object is selected based at least in part on the first and second social graph information. At step 540, a web page is generated that includes the first content object, as well as other objects.

Alternative Embodiments

Link alias providers such as link alias provider 180 provide shortened versions of URLs, which make the content associated with the URL easier to share. Many URLs are very long, causing users to wonder if they successfully pasted the entire URL into a form or an email when they attempt to share the URL. A 200 character URL may be shortened to a URL having only several characters, removing this fear. Examples of these link alias providers include bit.ly and tinyURL. In an embodiment, social signals may include the creation of link aliases.

FIG. 1C illustrates a block diagram of an environment in which an embodiment may be implemented. Content optimization engine 120 may make a request 179 to link alias provider 180 for a distribution metric associated with content objects provided by content provider 130. The distribution metric is a measure of popularity associated with a URL. This is determined by the link alias provider or any server with access to distribution data associated with links. The distribution metric is based on records kept by the link alias provider on how many times the shortened version of the URL was requested and translated into the long version of the URL in response to users clicking on the shortened link. The distribution metric may also be based on any other statistic derived from data collected from the link alias provider. For example, if the same user (based on IP address or other information) clicks on the same link over and over, then the distribution metric may be discounted for duplicate information. Each selection is a social signal that may be used to generate the distribution metric. The distribution metric may be used in conjunction with social graph information to aggregate content and/or rank content in an embodiment.

Many configurable user options may be provided to users to allow them to tune the amount and quality of content subjected to the methods described herein. For example, a user may wish to limit content suggestions based on social signals to content associated with social signals from particular social network service providers.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
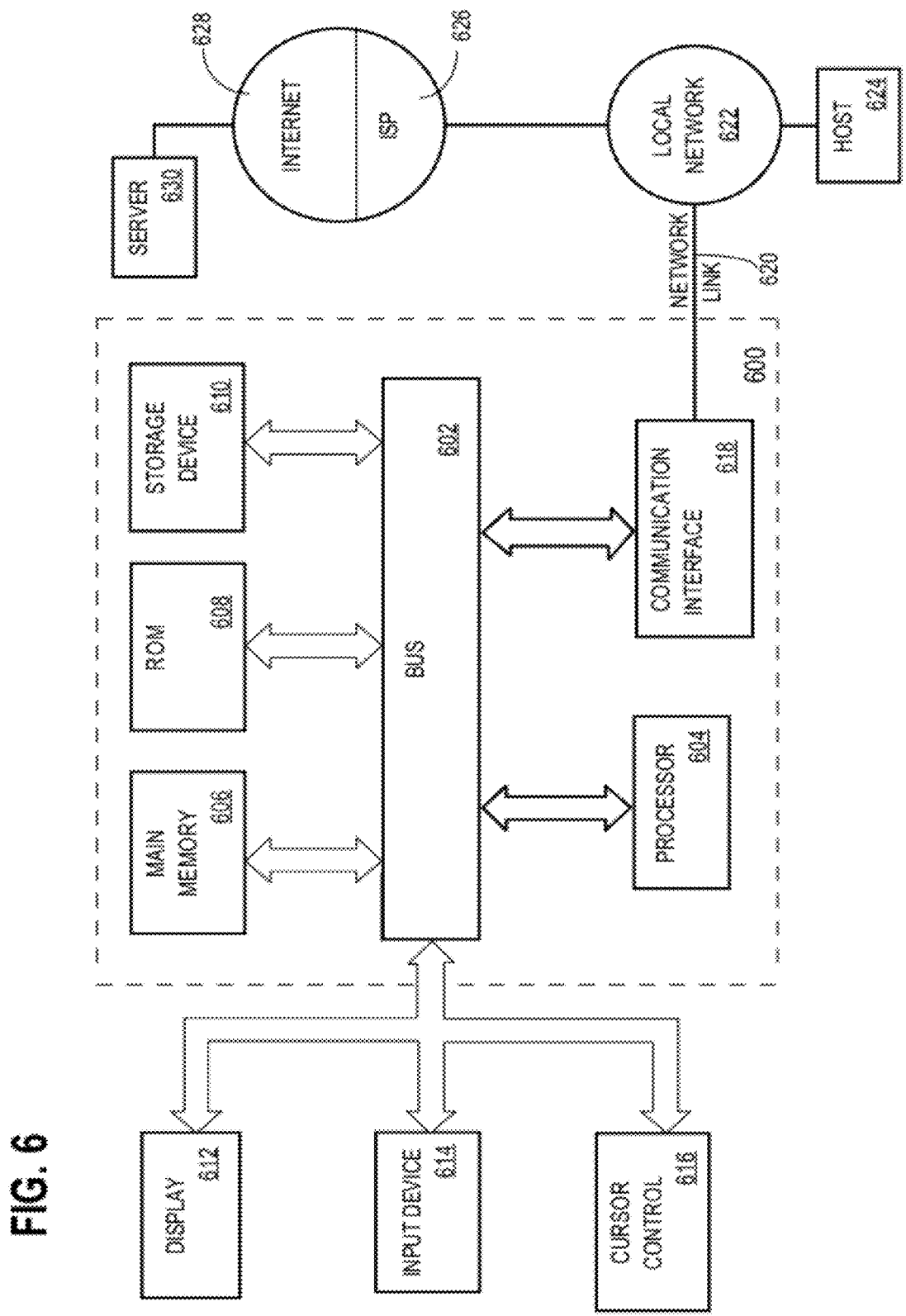
FIG. 6 illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method, comprising:
  receiving a first content set from a first content provider, wherein the first content set comprises at least one or more content objects having content-identifying information;
  receiving a second content set from a second content provider, wherein the second content set comprises at least one or more content objects having content-identifying information;
  receiving first social graph information from a first service provider, wherein the first social graph information identifies one or more users associated with a first user via the first service provider and the first social graph information includes one or more of:
  a separation metric that indicates that a second user is two or more degrees-of-separation away from the first user; and
  a group identifier that indicates that the second user is a member of a particular group associated with the first service provider;
  determining that the second user identified in the first social graph information has performed a first action associated with a first content object in the first content set;
  selecting, for inclusion in a third content set for the first user, at least a portion of the first content set and at least a portion of the second content set, wherein the selection is performed based at least in part on an identity of the first user and the first social graph information received from the first service provider;
  wherein said selecting includes selecting the first content item for inclusion in the third content set;
  based at least in part on the first action, determining a position in the third content set for the first content object;
  wherein the position is further determined based, at least in part, on the group identifier or the separation metric; and
  sending, to a client computing device that is associated with the first user, data that is based on the third content set;
  wherein the method is performed by one or more computing devices.

2. The method of claim 1, wherein the first social graph information includes a first user weighting metric associated with the second user, the method further comprising:
  determining the position in the third content set for the first content object based at least in part on the first user weighting metric.

3. The method of claim 1, wherein the first action comprises one or more of: (a) generating the first content object; (b) recommending the first content object; (c) flagging the first content object; (d) reviewing the first content object; (e) viewing the first content object; (f) posting a link to the first content object; and (g) posting content that is related to the first content object;
  wherein when the first action comprises posting first content that is related to the first content object, the method further comprises:

determining that the first content includes a first link alias that is associated with a first link, wherein the first link is a link to the first content object;

determining a distribution metric associated with the first link alias, wherein the distribution metric indicates the popularity of the first link alias; and based at least in part on the distribution metric, determining the position in the third content set for the first content object.

4. The method of claim 1, further comprising:

determining that a third user, identified in second social graph information received from a second service provider, has performed a second action associated with a second content object in the second content set; and based at least in part on the second action, determining a position in the third content set for the first content object.

5. A computer-readable non-transitory storage medium storing instructions which, when executed by one or more processors, causes the one or more processors to perform:

receiving a first content set from a first content provider, wherein the first content set comprises at least one or more content objects having content-identifying information;

receiving a second content set from a second content provider, wherein the second content set comprises at least one or more content objects having content-identifying information;

determining that a second user identified in a first social graph information has performed a first action associated with a first content object in the first content set;

receiving the first social graph information from a first service provider, wherein the first social graph information identifies one or more users associated with a first user via the first service provider and the first social graph information includes one or more of:

a separation metric that indicates that the second user is two or more degrees-of-separation away from the first user; and a group identifier that indicates that the second user is a member of a particular group associated with the first service provider;

selecting, for inclusion in a third content set for the first user, at least a portion of the first content set and at least a portion of the second content set, wherein the selection is performed based at least in part on an identity of the first user and the first social graph information received from the first service provider;

wherein said selecting includes selecting the first content item for inclusion in the third content set; and based at least in part on the first action, determining a position in the third content set for the first content object;

wherein the position is further determined based, at least in part, on the group identifier or the separation metric.

6. The computer-readable non-transitory storage medium of claim 5, wherein the first social graph information includes a first user weighting metric associated with the second user, and the instructions further include instructions for:

determining the position in the third content set for the first content object based at least in part on the first user weighting metric.

7. The computer-readable non-transitory storage medium of claim 5, wherein the first action comprises one or more of: (a) generating the first content object; (b) recommending the first content object; (c) flagging the first content object; (d) reviewing the first content object; (e) viewing the first content object; (f) posting a link to the first content object; and (g) posting content that is related to the first content object;

wherein when the first action comprises posting first content that is related to the first content object, the instructions further include instructions for:

determining that the first content includes a first link alias that is associated with a first link, wherein the first link is a link to the first content object;

determining a distribution metric associated with the first link alias, wherein the distribution metric indicates the popularity of the first link alias; and based at least in part on the distribution metric, determining the position in the third content set for the first content object.

8. The computer-readable non-transitory storage medium of claim 5, wherein the instructions further include instructions for:

determining that a third user, identified in second social graph information received from a second service provider, has performed a second action associated with a second content object in the second content set; and based at least in part on the second action, determining a position in the third content set for the first content object.

* * * * *